United States Patent [19]
Martin

[11] Patent Number: 5,673,772
[45] Date of Patent: Oct. 7, 1997

[54] SNOWMOBILE BRAKING SYSTEM

[76] Inventor: Robert L. Martin, P.O. Box 87, Swan Lake, Mont. 59911

[21] Appl. No.: 543,556

[22] Filed: Oct. 16, 1995

[51] Int. Cl.$^6$ ................................. B60T 1/14
[52] U.S. Cl. ................ 188/6; 188/8; 280/28.11; 280/605
[58] Field of Search ............... 188/5, 8, 32, 6; 280/28.11, 816, 605; 180/190

[56] References Cited

U.S. PATENT DOCUMENTS

| | | |
|---|---|---|
| 1,625,226 | 4/1927 | Simmons . |
| 2,402,379 | 6/1946 | Ganahl ............................ 244/112 |
| 2,838,138 | 7/1958 | Aylward ............................ 188/8 |
| 3,057,633 | 10/1962 | Brousseau ....................... 188/8 X |
| 3,550,707 | 12/1970 | Lange ................................ 180/5 |
| 3,698,497 | 10/1972 | Bombardier .................... 180/5 R |
| 4,061,296 | 12/1977 | Kubek ............................. 244/112 |
| 4,152,007 | 5/1979 | Smith .............................. 280/605 |
| 4,256,319 | 3/1981 | Winter ............................. 188/8 X |
| 4,362,524 | 12/1982 | Lob et al. ......................... 474/88 |
| 5,251,718 | 10/1993 | Inagawa et al. .................. 180/190 |
| 5,509,683 | 4/1996 | Daniel ........................ 280/28.11 X |

*Primary Examiner*—Peter M. Poon
*Attorney, Agent, or Firm*—Harry M. Cross, Jr.

[57] ABSTRACT

A snowmobile ski-type runner braking system provides a braking "claw" at the trailing end of each snowmobile ski-type runner that can be activated by the operator from his console to pivot downward into digging engagement with the snow to help brake the snowmobile. The claws are activated in unison so that balanced braking force is applied to each trailing ski end on both sides of the snowmobile. Even with the claws extended into their digging mode, the operator can still steer by turning the skis. Each claw can be actuated by an electric motor and power screw mechanism mounted on the runner. Alternately, each claw can be actuated by a hydraulic piston/cylinder mechanism mounted on the runner.

12 Claims, 5 Drawing Sheets

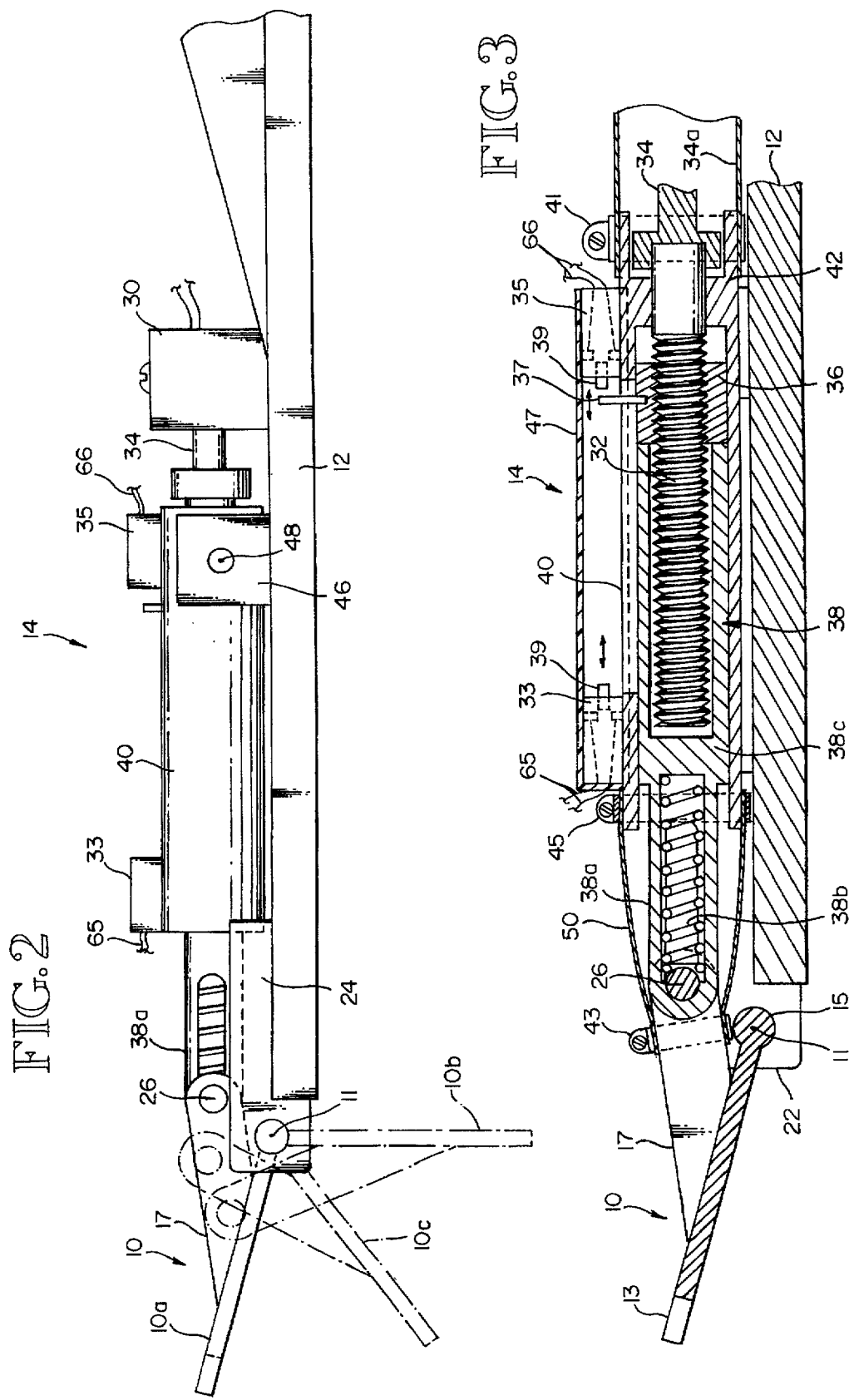

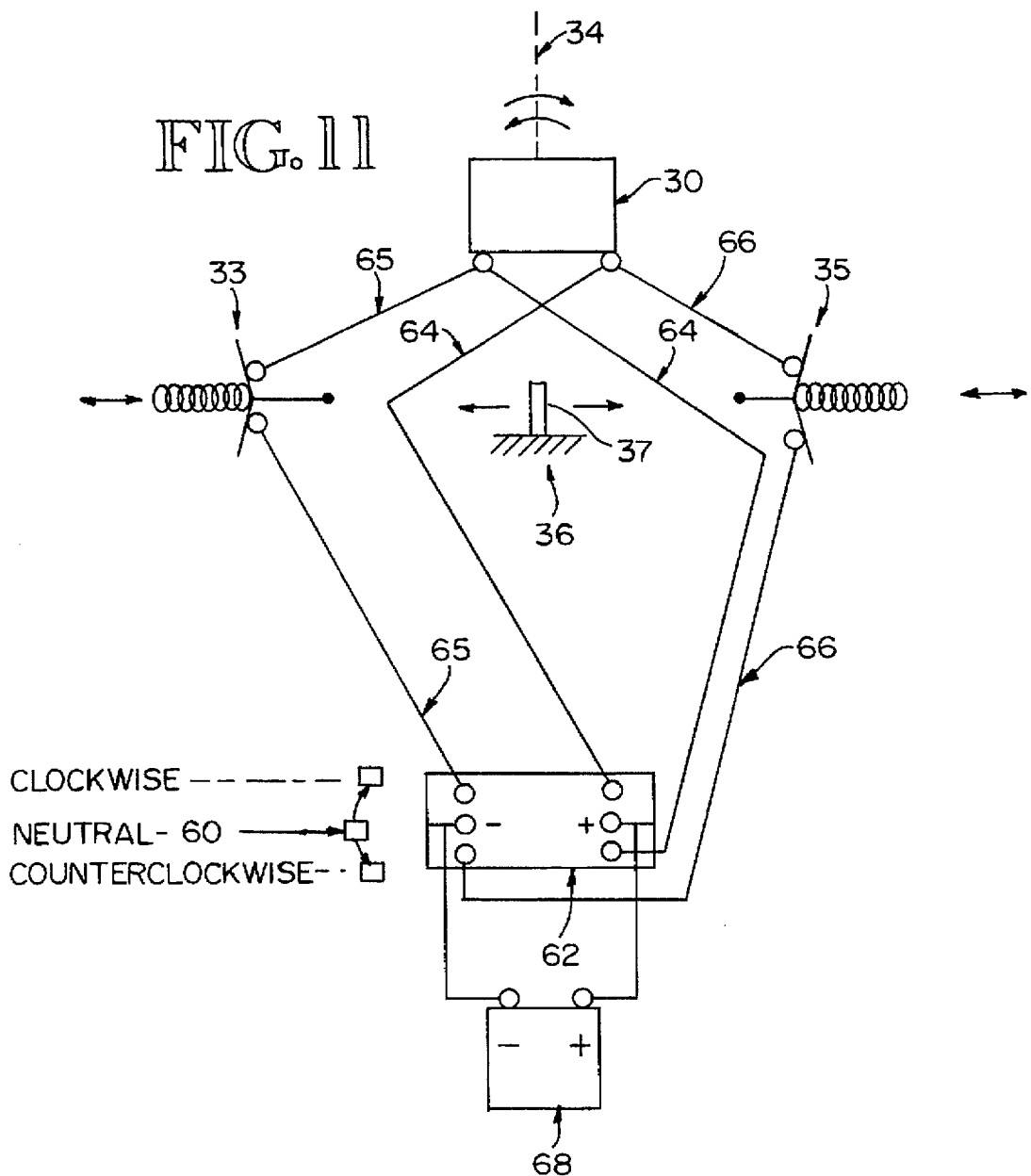

SNOWMOBILE BRAKING SYSTEM

BACKGROUND OF THE INVENTION

1. Field of the Invention

This invention relates to snowmobiles having ski-like runners and an endless track driving system. More particularly, this invention relates to ski-mounted braking systems for snow mobiles.

2. Brief Description of the Prior Art

A conventional snowmobile of the type having ski-like runners and an endless belt track driving system employs a braking mechanism associated with the track driving system to brake the machine. These driving system brake mechanisms are designed to retard the movement of the machine's endless belt drive tract. Since the drive track engages the snow or ground, retarding its movement is supposed to slow the machine's movement. However, there are a number of conditions that deleteriously affect the braking capability of such drive system brake mechanisms.

For example, when the machine is heading downhill in steep terrain, the braking action on the drive track may cause the track-ground/snow traction to break away, resulting in the machine heading downhill completely unbraked. Heading a snow machine downhill in icy or wet snow conditions can be particularly hazardous if the machine is braked while heading downhill because, to make that bad situation worse, with the drive system braked the slide downhill would be in an uncontrolled manner. To avoid such uncontrolled downhill slides, an experienced snowmobiler will head downhill under power to prevent his or her machine from loosing traction. When heading downhill under power, there must be present a substantial run-out area at the bottom of the slope over which the machine can be brought safely to a halt after being driven downhill.

For another example, when the snow machine is headed across a slope, particularly in icy or wet snow conditions, the rear end of the machine—where the drive track is positioned—may loose traction and swing-out downhill. This would cause the machine to slip sideways, a condition that can't be prevented or stopped by applying the drive system brake mechanism.

As still another example, in wet snow conditions, the drive track can loose traction because a layer of slush builds up underneath the track. The consequence of slush build-up under the track would be to cause the machine to travel downhill in an uncontrolled, unbraked manner, and/or to cause the machine to swing-out and slip sideways in an uncontrolled, unbraked manner.

SUMMARY OF THE INVENTION

A primary object of the present invention is to provide a braking system that can be applied to the ski-type runners of a snow mobile that can be operated independently of the machine's endless belt drive track system and any brake mechanism associated with the drive system. Another object is to provide such a runner brake system that will provide a snowmobiler with braking capability under those conditions where the machine's drive system brake mechanism would be ineffective or dangerous to apply. The system as shown in the drawings provides a braking "claw" at the trailing end of each snowmobile ski-type runner that can be activated by the operator from his console to pivot downward into digging engagement with the snow to help brake the snowmobile. The claws are activated in unison so that balanced braking force is applied to each trailing ski end on both sides of the snowmobile. Even with the claws extended into their digging mode, the operator can still steer by turning the skis. More generally, the braking claw is a snow-engaging means mountable on the ski-type runner so that it can be deployed into snow-engaging contact to drag on or cut into the surface over which the runner is traversing so as to create braking effect between the runner and the surface that is independent of the braking effect provided by the snow mobile's drive track system.

In accordance with the objectives of this invention, a snow mobile braking system comprises snow-engaging means mountable on a snowmobile ski-type runner such as at its trailing edge, mounting means for pivotably mounting the snow-engaging means to the runner so that the snow-engaging means can be pivoted between a retracted upper position and a deployed lower snow-engaging position, actuating means mountable on the runner and operatively connected to the snow-engaging means for deploying and retracting the snow-engaging means, and control means mountable to a snow mobile and operatively connectable to the actuating means so that a snow mobile operator can selectively control the actuating means to deploy and retract the snow-engaging means. In the preferred form of the invention, each of the two ski-type runners of a snow mobile are equipped with a braking system, and the control means is designed to operate both snow-engaging means simultaneously.

BRIEF DESCRIPTION OF THE DRAWINGS

FIG. 2 is a side elevation view of the FIG. 1 brake mechanism mounted to the trailing part of a snow mobile runner;

FIG. 3 is a side view in cross-section of the FIG. 2 mechanism, illustrating some of the internal working elements of the mechanism, and also illustrating a weather-protecting cover applied to the mechanism;

FIG. 11 is a schematic illustrating the FIG. 5 electrical control circuit wiring diagram for operating the motor-driven brake mechanism of the type illustrated in FIGS. 1–3.

DESCRIPTION OF THE PREFERRED EMBODIMENT

All snow mobiles have brakes that slow or stop the endless belt drive track from turning as do automobiles have brakes that stop the wheels from turning. But stopping the wheels on an automobile from turning on a steep icy hill will not stop the automobile from sliding. The same is true with a snow mobile. A steep hill with crusted snow makes the snow mobile's standard drive belt braking mechanism ineffectual. A covering of slush caused by rain or hot sun on a firm base produces the same result.

The speed, power, and momentum of today's snow mobiles will put the snowmobile up some exceedingly steep hills. In coming down, to keep the machine, head on, down the hill, the brake may be used only sparingly or not at all. This creates run-away conditions that have damaged many snowmobiles—some totally. It has caused many injuries up to and including death.

In climbing a hill, on the other hand, in a conventional snow mobile, when the drive track is spinning, loose snow and slush will be thrown out behind until the belt's cross cleats cut down to firm snow and good traction is established. When the belt and its cleats are crosswise to the slope of a hill, however, when the machine looses its traction, the cross cleats on the belt will tend to swing the machine so as to orient the cleats parallel with the slope, putting the machine into a "rollover" position. The typical drive system brake mechanism is helpless to counteract this.

The brake mechanism of the present invention provides an auxiliary brake that will permit the snow mobile rider to come down slowly, stop at will, and safely steer around trees and other objects. A ski brake is mounted to the rear edge of each ski or runner to provide a steerable braking affect. Each ski brake comprises a brake claw that can be extended to dig into the surface over which the snowmobile is traversing. The application of the ski brakes enables a snow mobile to retain its steerability, thereby preventing a run-away machine or out-of-control maneuver. Each ski brake claw is hinged so that it can be pivoted downward from the rear edge of the ski to which it is mounted. The outer edge of the claw is preferably sawtoothed to provide a braking edge to the snow or ice that the snowmobile is traversing. A brake activating mechanism, either electric or hydraulic, can be actuated by the machine operator to pivot the claw downward to engage the snow or ice and to hold the brake claw in its downward, braking position, and to release the claw so that it can be pivoted up and out of its braking position.

Figure 1:
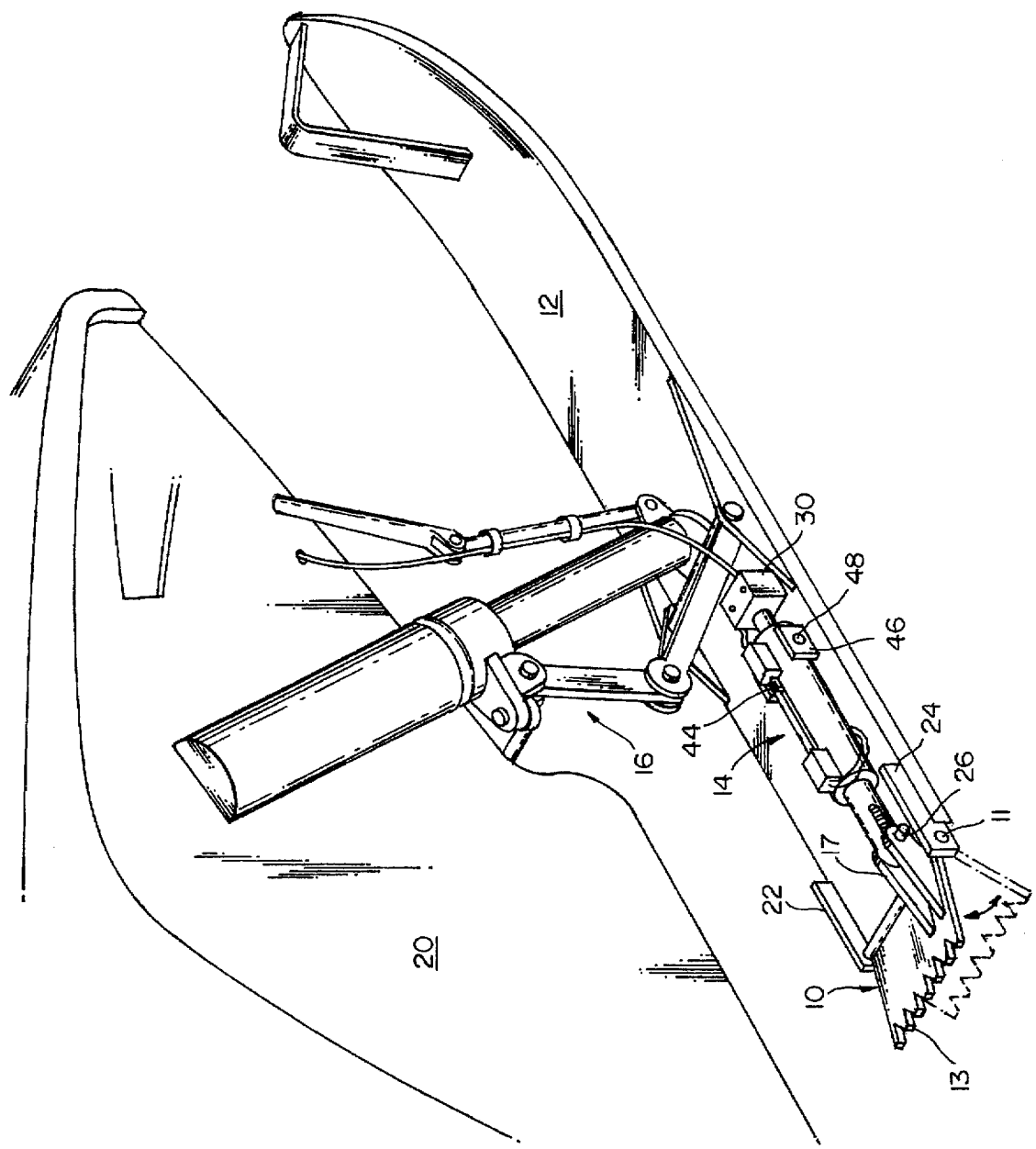
FIG. 1 is a side perspective view of the front end of a ski-type runner of a snow mobile with a ski brake mechanism according to this invention mounted on the trailing part of the machine's runner.
Figure 4:
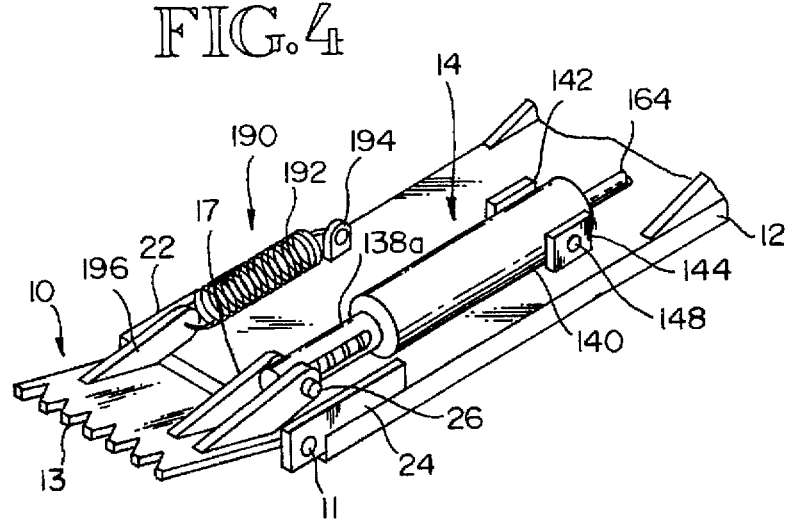
FIG. 4 is a perspective view of the trailing part of a snow mobile ski-type runner with another version of the ski brake mechanism mounted on the machine's runner.
Figure 5:
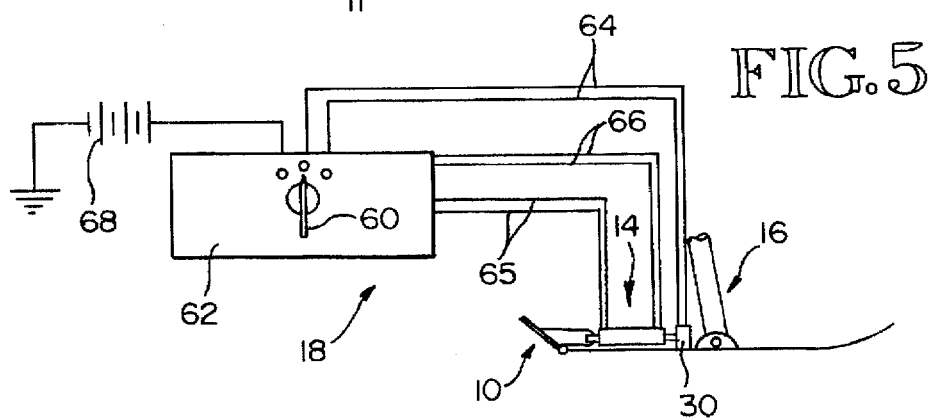
FIG. 5 is a schematic illustrating an electrical control circuit for operating a motor-driven brake mechanism of the type illustrated in FIGS. 1–3.
Figure 6:
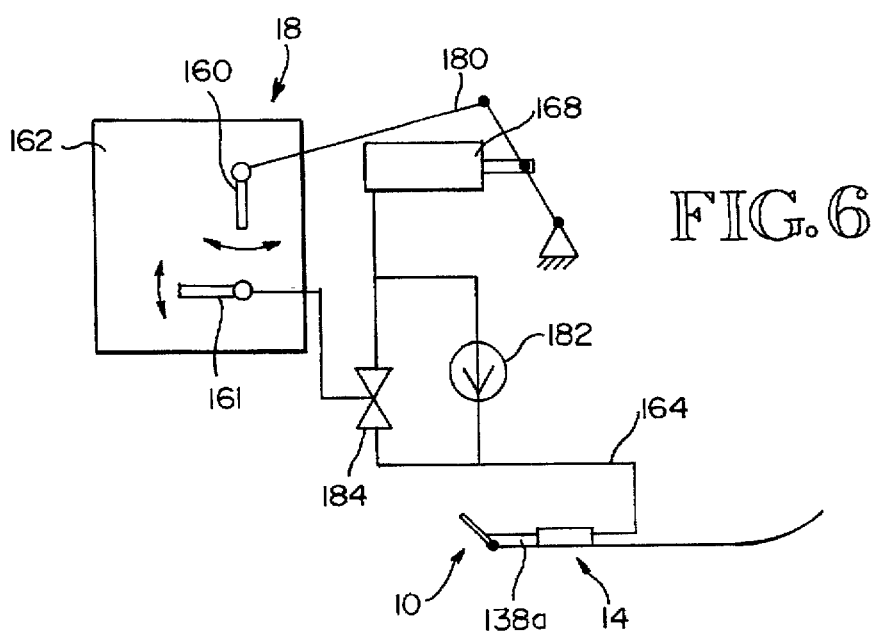
FIG. 6 is a schematic illustrating a hydraulic control circuit for operating a hydraulic cylinder-driven brake mechanism of the type illustrated in FIG. 4.

FIGS. 1–3 and 5 illustrate an electric-controlled ski brake system and FIGS. 4 and 6 illustrate a hydraulic-controlled ski brake system. In both systems a ski brake claw 10 is pivotably mounted to the trailing edge of each ski or runner 12 and is operably coupled to a brake actuating mechanism 14. The brake actuating mechanism 14 is mounted to the upper surface of the rear portion of the runner 12, behind the runner-supporting suspension system 16. The claw 10 is mounted for pivotal movement about a transverse axis 11 and is so coupled with brake actuating mechanism 14 that it can be pivoted from a generally horizontal rearward-extending resting position 10a (see FIG. 2) to a generally vertical downward-extending braking position 10b. Only one runner is shown in FIG. 1 but it is to be understood that both runners would be equipped with the ski brake mechanism of this invention. Generally speaking, the control mechanism 18 that controls the brake actuating mechanism 14, as shown in FIG. 5 (electric) and FIG. 6 (hydraulic) would operate both ski brakes on the left and rights sides of the snow mobile 20 simultaneously. Alternately, the control mechanism could be set up so that the snow mobile operator could selectively activate one or the other of the two brake actuating mechanisms, or to activate both brake actuating mechanisms but to different degrees. It has been found, however, that actuating both brake actuating mechanisms simultaneously provides sufficient auxiliary braking control over a snow mobile.

In both versions, electric and hydraulic, the ski brake claw 10 comprises a flat plate that is formed with a jagged or sawtoothed trailing edge 13 so that it can dig into snow or ice when pivoted down into the surface over which the snow mobile 20 traverses. The plate of claw 10 can be formed to provide a pivot shaft 15 at its leading edge (see FIG. 3), the center of which is at pivot axis 11, or suitable pins or end shafts can be attached to the leading edge to provide pivot elements at pivot axis 11. Pivot support brackets 22, 24 are each mounted to a side of the runner 12 at its trailing edge and pivot shaft 15 is pivotably mounted therein to pivotably mount claw 10 to the runner 12. Brackets 22, 24 protrude rearward of the runner 12 so that the plate of claw 10 actually is located completely rearward of the runner as seen in FIGS. 1–4. Brackets 22 and 24 are configured so that no part extends to or below the bottom running surface of runner 12 as seen in FIGS. 2–3 and so that the pivot axis 11 lies approximately in the plane of the top surface of runner 12, also as seen in FIGS. 2–3. A pivot actuating bracket 17 is mounted to the top surface of the plate of claw 10, preferably comprised of a pair of spaced-apart elements that provide a clevis for a connecting pin 26 to join the actuating mechanism 14 to the claw 10. Bracket 17 is configured to locate its clevis axis for pin 26 above the runner 12 over all positions assumable by the plate of claw 10 as seen in FIG. 2.

With reference now to the electric version of the invention as illustrated in FIGS. 1–3 and 5, the brake actuating mechanism 14 comprises a compact electric DC motor 30 mounted on the rear portion of the runner 12, just rearward of the snow mobile runner's connection to its suspension system 16, a power screw 32 rotatably connected to the output of motor 30 by means of a coupling 34, a power screw nut 36 threaded onto power screw 32, and an extendable/retractable ram 38 connected to nut 36 for longitudinal reciprocal movement as nut 36 traverses power screw 32. In many cases, the electric motor 30 will have to be mounted in front of the suspension system 16 and connected to the actuating mechanism 14 by means of a flexible shaft. The diameter of motor 30 must necessarily be small, so to get the power needed it would be 7 or 8 inches long, most likely, and this would necessitate mounting the motor 30 forward of the suspension system 16.

Nut 36 and ram 38 may be integral, nut 36 being the closed inner end of ram 38 and internally threaded so as to accept power screw 32, or nut 36 and ram 38 may be separate elements secured together to function as a unit. Ram 38 is provided with an internal elongated passageway within which power screw 32 is located. The outer end of ram 38 is provided as an elongated rod 38a through which clevis connecting pin 26 extends to connect ram 38 to the clevis of pivot actuating bracket 17. Ram 38, power screw 32 and nut 36 reside within an elongated tubular housing 40. The forward end of housing 40, adjacent motor 30, is provided with a power screw bearing portion 42 to support the inner end of power screw 32. The portion of ram 38 that resides within housing 40 closely fits within housing 40 in sliding contact therewith, power screw 32 being supported by bearing portion 42 and nut 36 and cantilevered from nut 36 into the ram's internal elongated passageway as shown in FIG. 3. Housing 40 is pivotably mounted between pivot brackets 44, 46, attached to the runner 12, for pivotal movement about axis 48 that extends through the brackets 44, 46.

Figure 7:
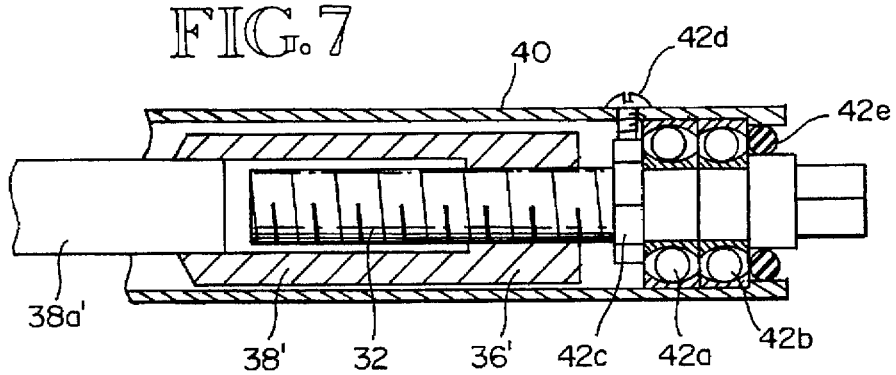
FIG. 7 is a fragmentary cross-section view of modified working elements within the FIGS. 1–3 version of the ski brake mechanism.

An alternative power screw mechanism is illustrated in FIG. 7. In this alternative, the power screw 32 is retained within the housing 40 by a pair of thrust bearing rings 42a, 42b. These bearing rings may be held in position by a locking collar 42c that is held in place by a set screw 42d and sealed by a seal ring 42e. Also as shown in FIG. 7, the ram may be provided as a hollow shaft 38' having a closed threaded inner end 36' that serves as the power nut. The outer end of shaft 38' is fitted with a rod 38a' that is connected to the pivot actuating bracket 17. Rod 38a' may be configured the same as rod 38a heretofore described.

As ram 38 is extended and retracted, housing 40 being pivotably supported by brackets 44, 46, the axis of clevis connecting pin 26 will rise and fall as the brake claw 10 is pivoted about its axis 11. Consequently, the trailing end of housing 40, from which rod 38a extends, will rise and fall slightly. Also, as the rod end of housing 40 rises and falls, the housing end adjacent to motor 30 will also pivot down and up. Therefore, coupling 34 must be sufficiently flexible to permit the necessary movement of housing 40 relative to the stationary motor 30. Since the housing pivot axis 48 is near the motor end of housing 40, the degree of pivotal movement of the motor end will be relatively small. Therefore, the degree of movement necessary may be accommodated by the connection between coupling 34 and power screw 32, or by providing a portion of coupling 34 as a flexible shaft, or by the connection between coupling 34 and motor 30, or by a combination of the foregoing.

As motor 30 is activated in one direction or another, power screw 32 will rotate in its bearing portion 42 of housing 40, driving nut 36 and ram 38 rearward and forward, as the case may be, so as to cause brake claw 10 to pivot about its pivot axis 11. When claw 10 is deployed to a braking position, to either a full position as indicated in FIG. 2 at 10b or to some intermediate position as indicated in FIG. 2 at 10c, the claw may hit an obstruction. In order to prevent any damage to the claw 10 or to any of the associated mechanism or to the runner 12, a compression spring 38b in provided within rod 38a to bear against clevis connecting pin 26 and against an intermediate partition 38c within ram 38. The sides of rod 38a are slotted, as at 38d (as seen in FIG. 2), so that clevis connecting pin 26 can extend forward against the spring force of spring 38b when claw 10 hits an obstruction. When the obstruction is passed over, the spring force of spring 38b will return pin 26 to the position shown in FIGS. 2–3. Consequently, the provision of a lost-motion connection between clevis connecting pin 26 and ram 38 permits the claw 10 to pivot up over an obstruction and then pivot back into the deployed braking position. The trailing end of rod 38a is closed so that pin 26 has a firm bearing stop against which it is held by the spring force of spring 38b so that retraction of ram 38 will cause claw 10 to be positively pivoted up to its retracted position 10 as seen in FIGS. 2–3.

Two electrical switches limit 33, 35 are mounted on top of housing 40, each of which has a spring-loaded plunger-type contact 39 that can be shifted inward, by an external force, to break electrical contact or can shift under spring force outward to make electrical contact. The housing between contacts 39, 39 is slotted so that an upright pin 37 can travel between switches 33, 35. Pin 37 is mounted to power screw nut 36 and travels back and forth with nut 36. As shown in FIGS. 3, 5 and 11, a power switch 60 on the snow mobile operator's dashboard 62 is connected through lead wires 64 to motor 30. The contacts of each switch 33, 35 are also connected through lead wires 65, 66. When power switch 60 is thrown, with the apparatus in the position shown in FIGS. 3 and 5, the motor 30 will drive the power screw 32 to cause the nut 36 to travel toward the trailing edge of the runner 12, thereby transporting pin 37 toward switch 33, and also deploying the brake claw 10. Power switch 60 can be turned to neutral or reversed at any time. But assuming the power switch is left on, motor 30 will continue to operate to deploy claw 10 from position 10a to position 10b, at which point, pin 37 will contact and depress plunger contact 39 on switch 33, thereby breaking the circuit across the contacts of switch 33 and leads 65 to turn off the motor 30. By reversing the power switch 60, the motor will then be powered to drive nut 36 forward, thereby retracting the brake claw 10, either until power switch 60 is turned to neutral or reversed or until pin 37 contacts and depresses plunger contact 39 on switch 35. When the plunger contact 39 on switch 35 is depressed, the circuit across the contacts of switch 35 and leads 66 will be broken to turn off the motor 30. The electric control circuit 18 can be powered from the snowmobile's DC battery 68.

Figure 8:
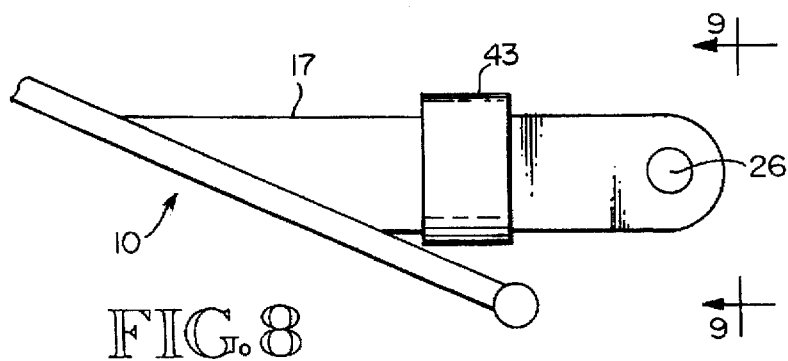
FIG. 8 is a side elevation view of the braking element that is mounted to the trailing end of a snow mobile's ski-type runner, illustrating a clamp for attaching a weather-protecting cover to the braking element.
Figure 9:
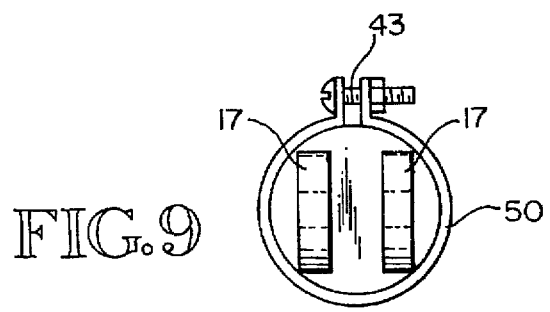
FIG. 9 is an end elevation view taken along the line 9—9 in FIG. 8; .

As shown in FIGS. 3, and 8–9, the operating portions of the brake actuating mechanism 14 that are exposed outside of housing 40 are protected by weather protectors. The coupling 34 may be protected by a weather-protective cover 34a that extends between housing 40 and motor 30 and is removably clamped to housing 40 by an appropriate clamp 41. The rod 38a may be protected by a weather-protective boot 50 that is removably clamped to pivot actuating bracket 17 and to housing 40 by appropriate clamps 43, 45. Boot 50 must be flexible and elongatable so that the movement of rod 38a and claw 10 are unimpeded. Also, the top portion of housing 40, contact switches 33, 35, and contact 37, are appropriately covered by a removable boot 47.

With reference now to the hydraulic version as illustrated in FIGS. 4 and 6, the brake actuating mechanism 14 comprises a hydraulic piston/cylinder 140 the piston rod of which is provided as an elongated rod 138a through which clevis connecting pin 26 extends to connect the piston rod to the clevis connecting bracket 17. Rod 138a is fitted out in the same manner as rod 38a in the electric version to prevent any damage to the claw 10 or to any of the associated mechanism or to the runner 12 including, as shown in FIG. 2 with respect to the electric version: a compression spring 38b bearing against clevis connecting pin 26 and against an intermediate partition within rod 138a; the sides of rod 138a being slotted, as at 38d as seen in FIG. 2, so that clevis connecting pin 26 can extend forward against the spring force of spring 38b when claw 10 hits an obstruction. Therefore, when the obstruction is passed over, the spring force of spring 38b will return pin 36 to the position shown in FIGS. 2–3. Consequently, the provision of a lost-motion connection between clevis connecting pin 26 and the piston rod permits the claw 10 to pivot up over an obstruction and then pivot back into the deployed braking position. The trailing end of rod 138a is closed so that pin 26 has a firm bearing stop against which it is held by the spring force of spring 38b so that retraction of piston rod will cause claw 10 to be positively pivoted up to its retracted position 10 as seen in FIGS. 2–3.

As the piston rod is extended and retracted, cylinder 140 being pivotably supported by brackets 144, 146, the axis of clevis connecting pin 26 will rise and fall as the brake claw 10 is pivoted about its axis 11. Consequently, the trailing end of cylinder 140, from which rod 138a extends, will rise and fall slightly. Also, as the rod end of cylinder 140 rises and falls, the end adjacent the snow mobile's suspension will also pivot down and up. Therefore, the connection between cylinder 140 and its hydraulic fluid supply line 164 must be sufficiently flexible to permit the necessary movement of cylinder 140. Since the cylinder pivot axis 148 is near the forward end of cylinder 140, the degree of pivotal movement at that will be relatively small. Therefore, the degree of movement necessary may be accommodated by the connection between cylinder 140 and hydraulic line 164 or by providing a portion of line 164 as a flexible hose.

The operating portion of the brake actuating mechanism 14 that is exposed outside of cylinder 140 is protected by a weather protector. The rod 138a may be protected, in the same manner as rod 38a of the electric version, by the weather-protective boot 50 that is removably clamped to pivot actuating bracket 17 and to cylinder 140 by appropriate clamps, such as the clamps 43, 45 illustrated in FIGS. 3, and 8–9. Boot 50 must be flexible and elongatable so that the movement of rod 138a and claw 10 are unimpeded.

A supply 168 of hydraulic fluid is provided to the hydraulic cylinder of the hydraulic version by means of hydraulic line 164. Supply 168 may be conveniently provided as a master cylinder that includes a manually-operable compression assembly 180 that is operable through a suitable linkage so that a lever 160 on the snow mobile's dashboard 162 can be manipulated to apply pressure to the supply 168. The lever 160 and linkage of assembly 180 can be designed so that a given manipulation of lever 160 will effect a predetermined extension of rod 138a and, therefore, a predetermined deployment of claw 10. Therefore, with a predetermined number of manipulations of lever 160, the claw 10 can be fully deployed. In the control schematic illustrated in FIG. 6, when lever 160 is manipulated to pressurize the fluid within supply 168, the pressure is exerted through one-way check valve 182 so that the applied pressure will remain to hold the claw 10 in the degree of deployment effected by the manipulation. Further manipulation of lever 160 will maintain the applied increased pressure through one-way valve 182. When it is desired to release the pressure extending rod 138a and deploying the claw 10, a release lever 161 on the dashboard 162 can be manipulated to open bypass valve 184, thereby equalizing the pressure throughout the hydraulic system.

Figure 10:
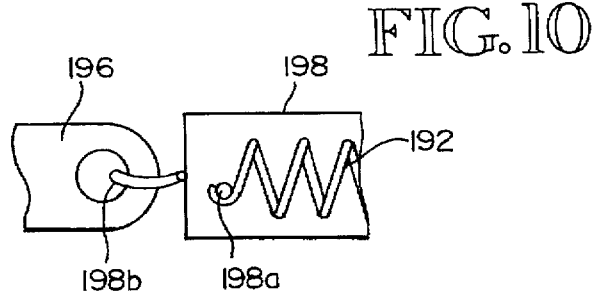
FIG. 10 is a schematic view illustrating the application of a weather-protecting cover to a return element of the ski brake mechanism.

In its simplest form, the hydraulic system employs a single-acting hydraulic piston/cylinder. Therefore, when control valve 184 is opened to equalize the system pressure, a return spring assembly 190 on the runner 12 will return the claw 10 to its upright, undeployed position shown in FIG. 4. Assembly 190 comprises a coil spring 192 that is anchored to the runner 12 by a hook and bracket fixture 194. The opposite end of spring 192 is anchored to a bracket 196 that is attached to the plate of the claw 10 as shown in FIG. 4. When the pressure is released in cylinder 140, the spring force of spring 192 will be sufficient to pivot claw 10 about its axis 11. As shown in FIG. 10, a weather-protective flexible boot 198 can be provided to enclose the spring 192, the spring being anchored at 198a inside of the boot and the boot, in turn, being anchored by hook 198b to the bracket 196.

While the preferred embodiment of the invention has been described herein, variations in the design may be made. For example, whereas the drawings illustrate the various components as being separately mounted to the snow mobile's runner, one or more of the components may be mounted to a mounting plate and that mounting plate, in turn, mounted to the runner. This would perhaps make the entire runner-mounted portion of the invention more suitable for installation as a retro-fit kit to existing snow mobiles. On the other hands, separate mounting of the components might make for a lighter installation and might be preferred for factory installation on new machines. The scope of the invention, therefore, is only to be limited by the claims appended hereto.

The embodiments of the invention in which an exclusive property is claimed are defined as follows:

1. A snowmobile braking system comprising snow-engaging means mountable on a snowmobile ski-type runner; mounting means for pivotably mounting said snow-engaging means to said runner so that said snow-engaging means can be pivoted between a retracted upper position and a deployed lower snow-engaging position; actuating means mountable on said runner and operatively connected to said snow-engaging means for deploying and retracting said snow-engaging means; and control means mountable to a snowmobile and operatively connectable to said actuating means so that a snowmobile operator can selectively control said actuating means to deploy and retract said snow-engaging means; and lost-motion connection means connecting said actuating means to said snow-engaging means so that said snow-engaging means can be deflected over an obstruction when in a deployed position and then returned to its deployed position without affecting control of said actuating means .

2. The system of claim 1 including a second snow-engaging means mountable at the trailing edge of a second snowmobile ski-type runner; second mounting means for pivotably mounting said second snow-engaging means to said second runner so that said second snow-engaging means can be pivoted between a retracted upper position and a deployed lower snow-engaging position; second actuating means mountable on said second runner and operatively connected to said second snow-engaging means for deploying and retracting said snow-engaging means; and wherein said control means is operatively connectable to said second actuating means so that a snowmobile operator can selectively control said second actuating means to deploy and retract said second snow-engaging means; said control means being so constructed and arranged that the first and second snow-engaging means may be deployed and retracted simultaneously; and second lost-motion connection means connecting said second actuating means to said second snow-engaging means so that said second snow-engaging means can be deflected over an obstruction when in a deployed position and then returned to its deployed position without affecting control of said second actuating means.

3. The system of claim 2 wherein said second snow-engaging means comprises a claw having a sawtoothed outer end for digging into the surface over which the snowmobile traverses.

4. The system of claim 2 wherein said actuating means comprises an electric motor mountable on said runner, and a ram connected to said snow-engaging means and powered by a power screw coupled to said motor for reciprocating movement so as to effect deployment and retraction of said snow-engaging means; and wherein said second actuating means comprises a second electric motor mountable on said second runner, and a second ram connected to said second snow-engaging means and powered by a second power screw coupled to said second motor for reciprocating movement so as to effect deployment and retraction of said second snow-engaging means.

5. The system of claim 2 wherein said actuating means comprises a hydraulic piston/cylinder mountable on said runner, the piston connected to said snow-engaging means for reciprocating movement so as to effect deployment and retraction of said snow-engaging means; and wherein said second actuating means comprises a second hydraulic piston/cylinder mountable on said second runner, the second piston connected to said snow-engaging means for reciprocating movement so as to effect deployment and retraction of said second snow-engaging means.

6. The system of claim 2 wherein said snow-engaging means comprises a claw having a sawtoothed outer end for digging into the surface over which the snowmobile traverses; and said actuating means comprises an electric motor mountable on said runner, and a ram connected to said snow-engaging means and powered by a power screw coupled to said motor for reciprocating movement so as to effect deployment and retraction of said snow-engaging means; and wherein said second snow-engaging means comprises a second claw having a sawtoothed outer end for digging into the surface over which the snowmobile traverses; and said second actuating means comprises a second electric motor mountable on said second runner, and a second ram connected to said second snow-engaging means and powered by a second power screw coupled to said motor for reciprocating movement so as to effect deployment and retraction of said second snow-engaging means.

7. The system of claim 2 wherein said snow-engaging means comprises a claw having a sawtoothed outer end for digging into the surface over which the snowmobile traverses; and said actuating means comprises a hydraulic piston/cylinder mountable on said runner, the piston connected to said snow-engaging means for reciprocating movement so as to effect deployment and retraction of said snow-engaging means; and wherein said second snow-engaging means comprises a second claw having a sawtoothed outer end for digging into the surface over which the snowmobile traverses; and said second actuating means comprises a second hydraulic piston/cylinder mountable on said second runner, the second piston connected to said second snow-engaging means for reciprocating movement so as to effect deployment and retraction of said second snow-engaging means.

8. The system of claim 1 wherein said snow-engaging means comprises a claw having a sawtoothed outer end for digging into the surface over which the snowmobile traverses.

9. The system of claim 1 wherein said actuating means comprises an electric motor mountable on said runner, and a ram connected to said snow-engaging means and powered by a power screw coupled to said motor for reciprocating movement so as to effect deployment and retraction of said snow-engaging means.

10. The system of claim 1 wherein said actuating means comprises a hydraulic piston/cylinder mountable on said runner, the piston connected to said snow-engaging means for reciprocating movement so as to effect deployment and retraction of said snow-engaging means.

11. The system of claim 1 wherein said snow-engaging means comprises a claw having a sawtoothed outer end for digging into the surface over which the snowmobile traverses; and said actuating means comprises an electric motor mountable on said runner, and a ram connected to said snow-engaging means and powered by a power screw coupled to said motor for reciprocating movement so as to effect deployment and retraction of said snow-engaging means.

12. The system of claim 1 wherein said snow-engaging means comprises a claw having a sawtoothed outer end for digging into the surface over which the snowmobile traverses; and said actuating means comprises a hydraulic piston/cylinder mountable on said runner, the piston connected to said snow-engaging means for reciprocating movement so as to effect deployment and retraction of said snow-engaging means.

* * * * *